United States Patent
Asai

[11] Patent Number: 6,164,952
[45] Date of Patent: Dec. 26, 2000

[54] APPARATUS FOR INJECTION COMPRESSION MOLDING THIN DISC SUBSTRATA

[75] Inventor: Ikuo Asai, Aichi-ken, Japan

[73] Assignee: Kabushiki Kaisha Meiki Seisakusho, Aichi-ken, Japan

[21] Appl. No.: 09/132,499

[22] Filed: Aug. 11, 1998

[30] Foreign Application Priority Data

Aug. 29, 1997 [JP] Japan .................................. 9-250046

[51] Int. Cl.[7] .................................................. B29C 45/00
[52] U.S. Cl. ........................... 425/542; 425/810; 264/1.33
[58] Field of Search ..................................... 425/190, 542, 425/810; 264/1.33

[56] References Cited

U.S. PATENT DOCUMENTS

| 4,627,809 | 12/1986 | Okabayashi et al. | 425/555 |
|---|---|---|---|
| 5,593,710 | 1/1997 | Asai | 425/552 |
| 5,612,062 | 3/1997 | Takahashi | 425/3 |
| 5,720,994 | 2/1998 | Asai | 425/556 |
| 5,792,492 | 8/1998 | Takahashi | 425/547 |

FOREIGN PATENT DOCUMENTS

| 60-067124 | 4/1985 | Japan . |
|---|---|---|
| 6-134821 | 5/1994 | Japan . |

Primary Examiner—Tim Heitbrink
Assistant Examiner—Donald Heckenberg
Attorney, Agent, or Firm—Browdy and Neimark

[57] ABSTRACT

A mold for injection molding thin discs for DVD has a cavity (C) bounded by a information-bearing stamper (29) surface, a mirror plate (31) opposite to the stamper surface, and the tip (33s) of an inserting block (33) at a central opening in the mirror plate. The tip surface (33s) protrudes into the cavity past the surface of the mirror plate between 10 $\mu$m and 70 $\mu$m. The mirror plate molding surface is slightly frusto-conical, with a gradient Y/R gradually increasing the depth of the cavity toward the periphery. R is approximately 40 mm and Y lies in the range of 5 $\mu$m and 30 $\mu$m. The mirror plate is preferably manufactured flat on the surface facing the mold, but bolted down onto a frusto-conical backing plate or on top of a central ring, so that it is stressed into the desired shallow cone shape. The invention includes a method of injecting resin with lower clamping force of about 2 tons and then applying a higher force of about 17 tons.

4 Claims, 6 Drawing Sheets

APPARATUS FOR INJECTION COMPRESSION MOLDING THIN DISC SUBSTRATA

BACKGROUND OF THE INVENTION

The present invention relates to a method and an apparatus for molding thin disc substrata, for example in DVD.

DESCRIPTION OF THE RELATED TECHNOLOGY

Today consumers prefer DVD optical discs, which are capable of storing more digital information than a compact disc but on the disc size of a compact disc, 120 mm diameter. The DVD disc has two discs laminated as shown in FIG. 6. Two disc substrata 11, 12, each of which is 0.6 mm in thickness, are laminated by adhesive layer 18 so that information surfaces 13, 14 are face-to-face.

In DVD disc molding, to achieve low birefringence the occurrence of residual stress must be avoided. However, it is found that in molding to avoid residual stress the melted resin does not sufficiently reach to the outer periphery of the cavity, or the outer periphery portion of the disc is molded thinner than the central portion. Injection molding of DVD disc substrata 120 millimeters in diameter and 0.6 millimeter thick has been tried by conventional injection molding methods, but it has been found that the melted resin incompletely filled to the outer periphery of the disc or the thickness was not even.

Japanese Opened Patent Application 60-67124, entitled "Mold and stamper for injection molding plastic disk as carrier of high density information recording", refers to molding of discs with less residual stress. It discloses injection molding in which melted resin is injected through a sprue into the disc cavity in the closed mold under control of the speed and pressure of injected melted resin, wherein the thickness of the disc cavity is large in proportion to its diameter.

Another publication is U.S. Pat. No. 5,720,994, which discloses a mold for molding disc substrata in which an inserting block protrudes slightly into the molding cavity.

The DVD-9 (dual layer) standard, which regulates the thickness of DVD discs, specifies the thickness deviation as less than 10 microns ($10^{-3}$ millimeters). In addition, it is required that molded discs with have birefringence less than +100 nm, and preferably less than 70 nm, in double pass measurement, in order that pit signals can be accurately read on the information area of the discs.

SUMMARY OF THE INVENTION

Accordingly, the present invention has an object, among others, to overcome deficiencies in the prior art such as noted above.

In light of the above mentioned problems, it is another object of the present invention to provide a novel method and a mold for molding thin DVD discs with even thickness in rapid molding cycles.

A further object of the present invention is to provide a novel method and a mold for molding discs with even thickness and with lower residual stress in rapid molding cycles in order to improve the optical properties of the discs.

A further object provide a novel method and mold for saving maintenance costs of the movable mirror plate.

Other objects and features of the present invention will become apparent to those skilled in the art from the following specification in conjunction with the accompanying drawing.

BRIEF DESCRIPTION OF THE DRAWING FIGURES

The above and other objects and the nature and advantages of the present invention will become more apparent from the following detailed description of an embodiment taken in conjunction with drawings, wherein.

DETAILED DESCRIPTION OF THE PREFERRED EMBODIMENTS

The present invention will be described detailed by way of example, with reference to the accompanying drawings.

Figure 1:
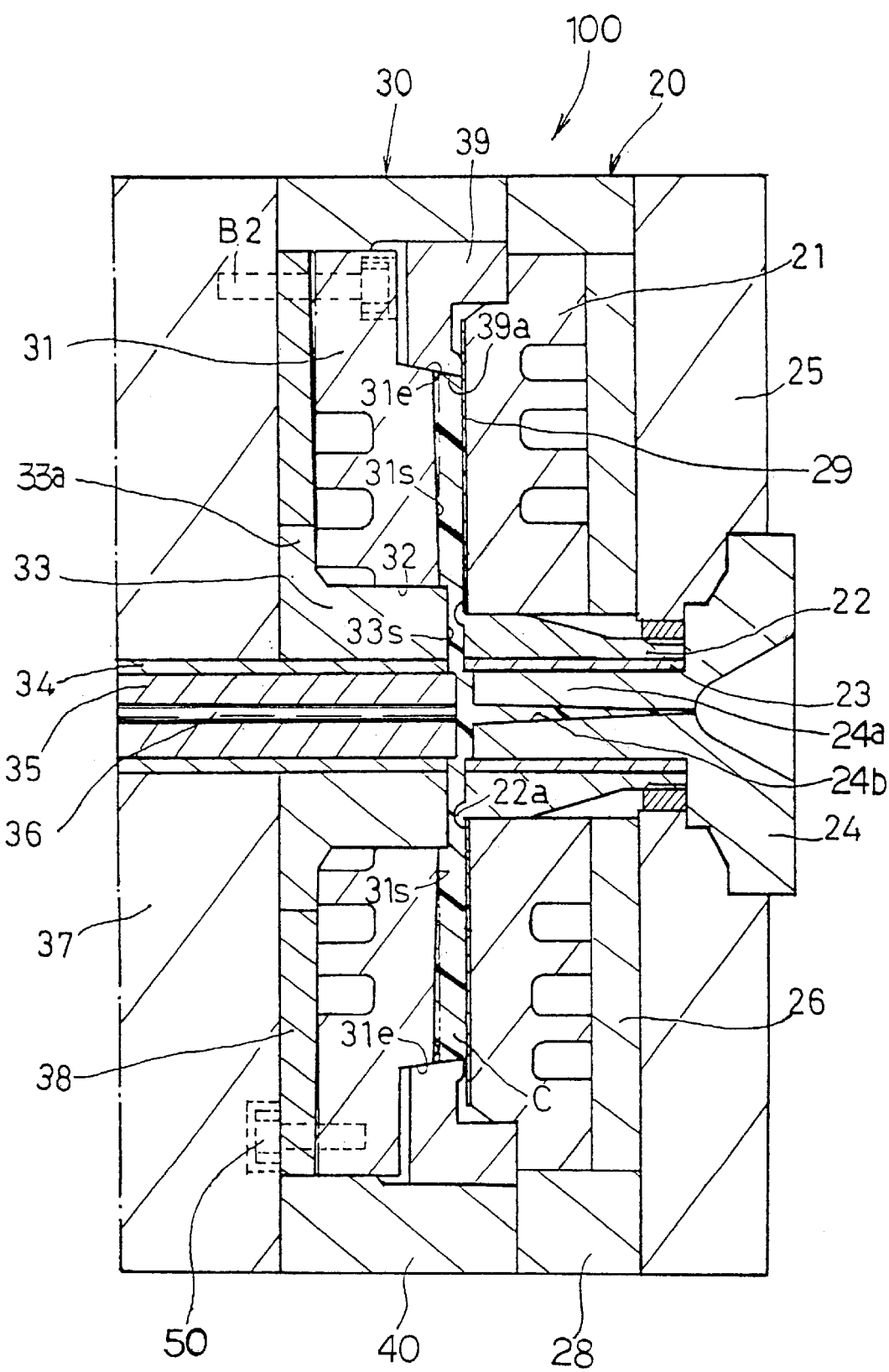
FIG. 1 is a sectional elevation of the moldhalves of the present invention in which the gradient of depth of the cavity is brought about by the surface gradient of the back-up plate.

Referring to FIG. 1, moldhalves 100 for injection compression molding of DVD disc substrata are shown, including a stationary mold-half 20 and a movable mold-half 30. The stationary mold-half 20 includes a stationary base plate 25 and a stationary outer cylindrical plate 28 which is fixed on the side surface of the stationary base plate 25. A stationary mirror plate 21 is stacked on a stationary back-up plate 26 and these plates are fixedly inserted together into the inner periphery of the stationary outer cylindrical plate 28. A sprue bushing 24 with a stem 24*a* is fixedly inserted into each bore provided in the center portion of the stationary base plate 25, the stationary back-up plate 26, and the stationary mirror plate 21. A female cutter 23 is fixedly inserted on the outer periphery of the stem 24*a*, which has an inner hole 24*b*. An inner stamper retainer 22 is inserted on the outer periphery of the female cutter 23. A stamper 29 is retained on the surface of the stationary mirror plate 21 by the inner stamper retainer 22 and an outer stamper retainer 39. The stamper 29 may be retained on the movable mold-half 30 if need be.

A movable moldhalf 30 includes a movable base plate 37, a movable outer cylindrical plate 40 which is fixed on the side surface of the movable base plate 37, and a movable mirror plate 31 stacked on a movable back-up plate 38. These plates being fixedly inserted into the inner periphery of the movable outer cylindrical plate 40.

An inserting block 33 is fixedly inserted concentric with a circular central opening 32 of the movable mirror plate 31. An ejector sleeve 34, a male cutter 35, and a center ejector pin 36 are assembled and inserted together into an inner periphery of the inserting block 33. The inserting block 33 has a flange 33*a* and a tip surface 33*s* protruding 10 $\mu$m to 70 $\mu$m from the mirror surface 31*s* of the movable mirror plate 31 into a disc cavity C, in which the disc is molded.

When the mold is closed the disc cavity C is bounded by the surface of the stamper 29, the front surface of the inner stamper retainer 22, the front surface of female cutter 23, the front surface of the sprue bushing 24, the surface of the movable mirror plate 31, the front surface of the inserting block 33, the front surface of the ejector sleeve 34, the front surface of the male cutter 35, and the inner peripheral surface of the outer stamper retainer 39.

The outer periphery surface 31e of the movable mirror plate 31, on which the inner peripheral surface 39a of the outer stamper retainer 39 makes contact, is 120 mm in diameter and the inner periphery surface 32 of the movable mirror plate 31, in which the inserting block 33 is inserted, is 40 mm in diameter. In the present invention, the surface of the stamper 29 mounted on the stationary mirror plate 21 is kept flat and the surface 31s of the movable mirror plate 31 is inclined in order to increase the depth of the cavity C in proportion to the diameter of the outer periphery of the movable mirror plate 31 from the periphery of the central opening 32 of the movable mirror plate 31. The surface 31s of the movable mirror plate 31 is preferably inclined at a gradient of Y/R (as shown in the cross section of FIG. 2), wherein Y is from 5 $\mu$m to 30 $\mu$m and R is 40 mm.

Figure 2:
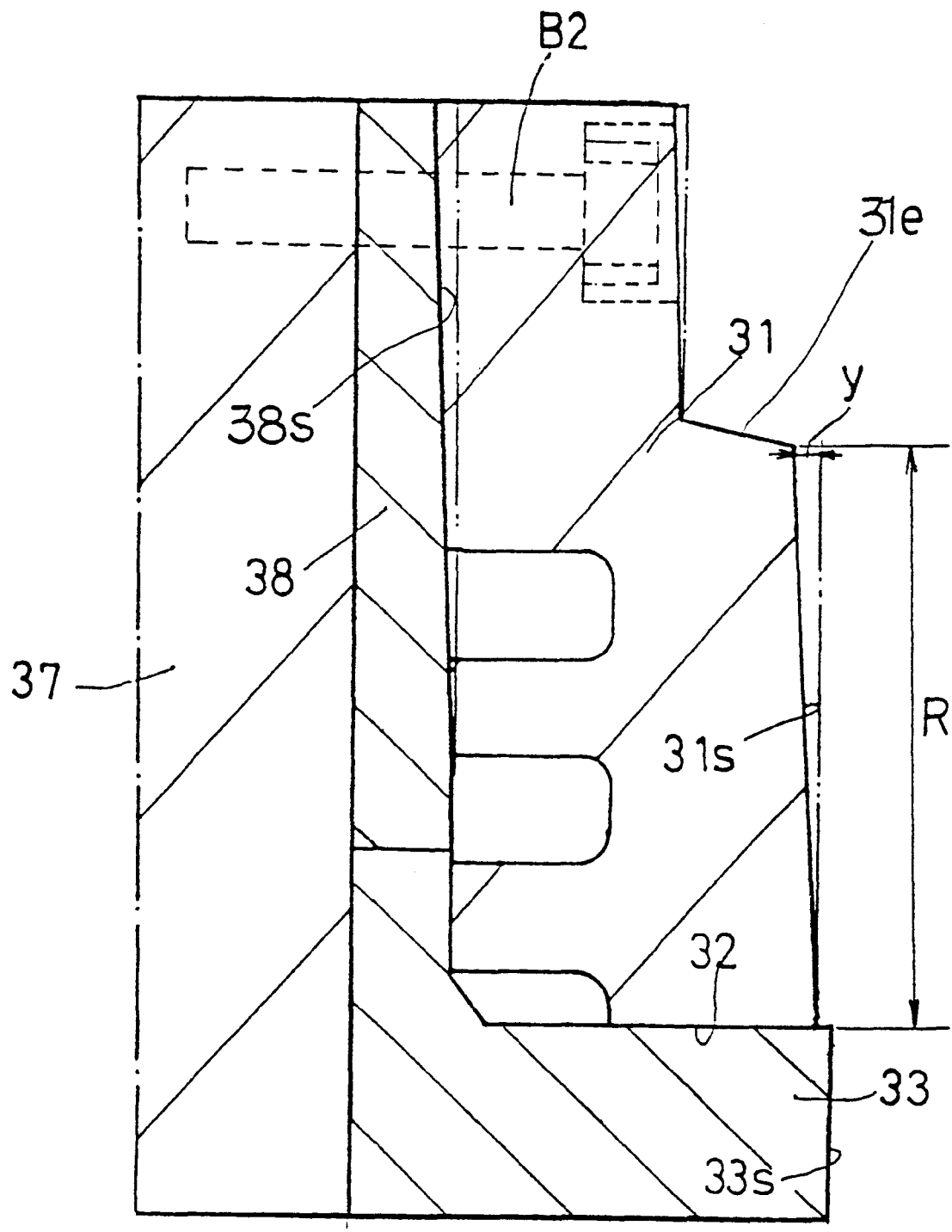
FIG. 2 is a fragmentary enlarged sectional elevation of the movable mirror plate and the movable back-up plate of FIG.1.

However, if the surface 31s of movable mirror plate 31 is machined with a gradient and is flawed, its repair would be more difficult and expensive than repairing a flat movable mirror plate. Therefore, in one embodiment of the present invention, shown in FIG. 1 and FIG. 2, the surface 31s of the movable mirror plate 31 is flat when unstressed but the surface 38s of the movable back-up plate 38 is inclined at a gradient of Y/R as shown in FIG. 2, wherein Y is 5 $\mu$m to 30 $\mu$m and R is 40 mm. The movable mirror plate 31 with the flat surface is fastened by bolts B2 on the surface 38s of the movable back-up plate 38 and by the force of the bolts is bent to a gradient of Y/R, resulting in increasing the depth of the cavity C in proportion to diameter in the range of the outer periphery of the movable mirror plate 31, or, from the periphery of the central opening 32 of the movable mirror plate 31 outward.

The dot-dashed line in FIG. 2 may also represent that the back of the mirror plate 31 is beveled.

Figure 3:
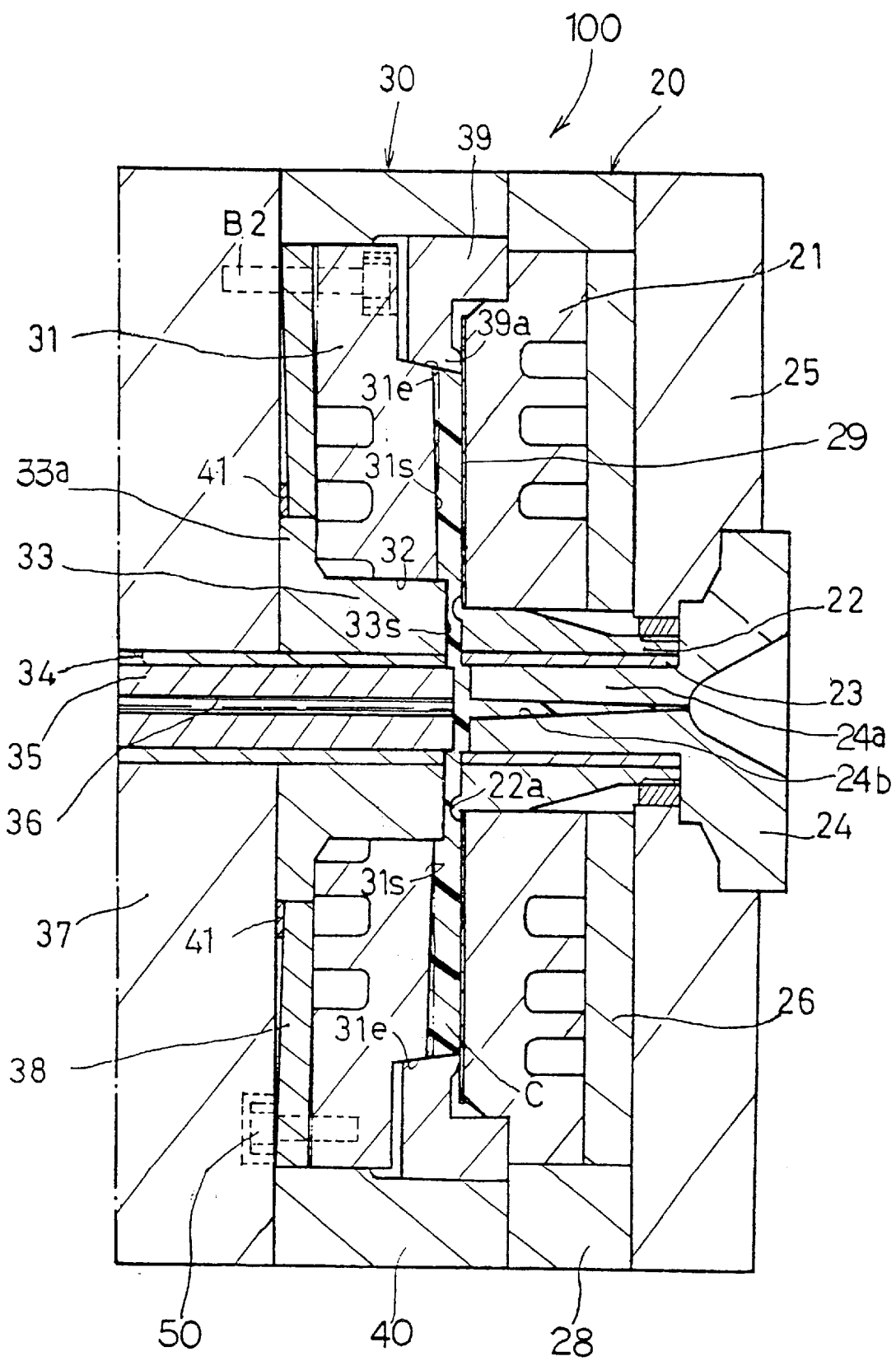
FIG. 3 is a sectional elevation of the moldhalves in another embodiment of the present invention in which the gradient of depth of the cavity is brought about by a spacer inserted on the outer periphery of the flange of the inserting block.
Figure 4:
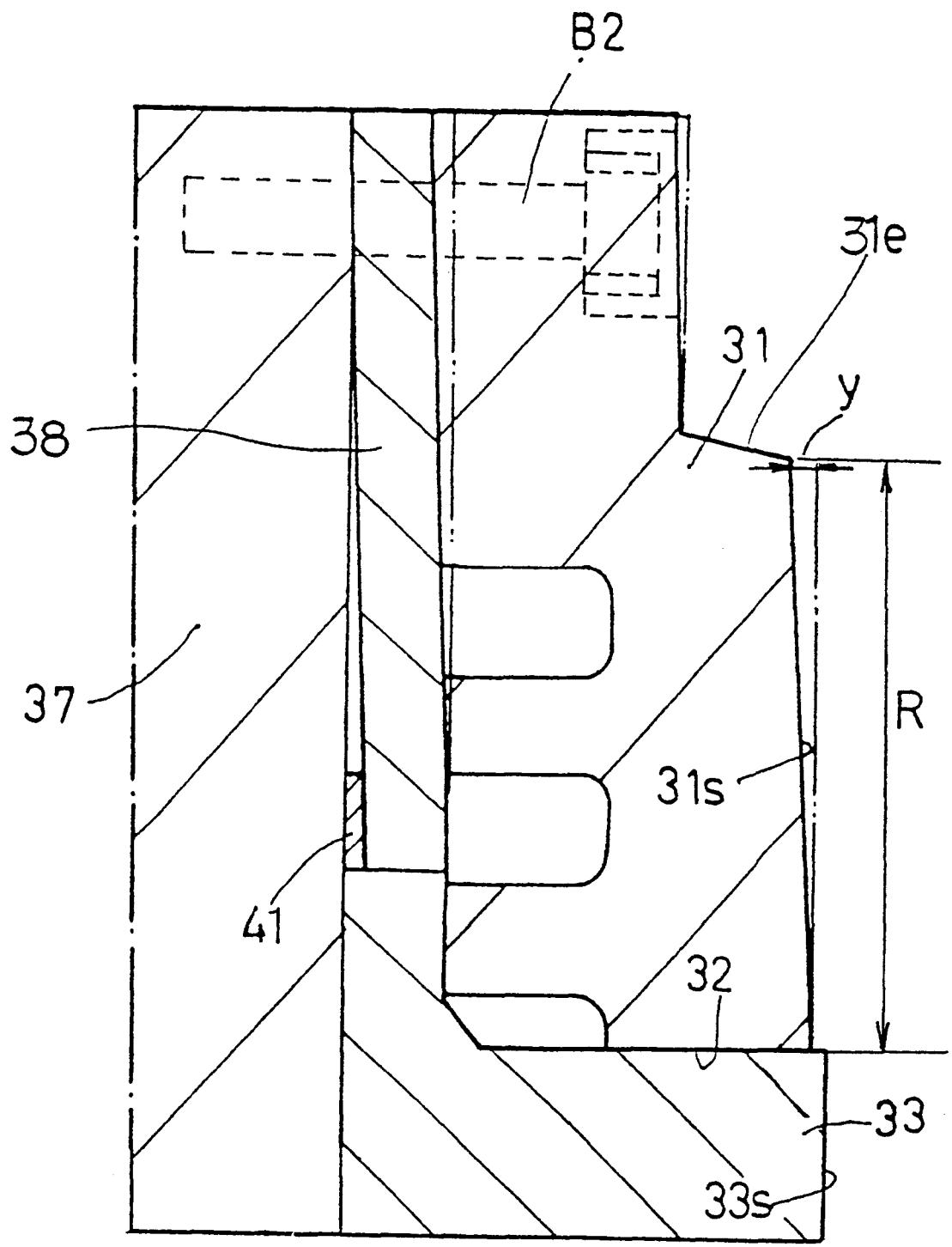
FIG. 4 is a fragmentary enlarged sectional elevation of the movable mirror plate, the movable back-up plate, and the spacer of FIG. 3.

FIG. 3 and FIG. 4 shows another embodiment of the present invention, in which neither the surface 31s of the movable mirror plate 31 nor the surface 38s of the movable backup plate 38 is inclined. To make the gradient of Y/R on the surface of the movable mirror plate 31 when mounted, at least one spacer 41 of a doughnut or ring shape is inserted on or near the outer periphery of the flange 33a of the inserting block 33. Then the movable mirror plate 31 and the movable back-up plate 38 are fastened to the movable base plate 37 by the bolts B2, again resulting in increasing the depth of the cavity C in proportion to diameter in the range of the periphery of the central opening 32 to the outer periphery of the movable mirror plate 31.

The number of spacers 41, the thickness, and the outer diameter or diameters of the spacer 41 are defined by the required gradient of the surface of the movable mirror plate 31. In this embodiment the thickness of the spacers 41 are in the range of 10 to 40 $\mu$m and the gradient of the surface of the movable mirror plate 31 is Y/R as shown in FIG. 4, wherein Y is 5 $\mu$m to 30 $\mu$m and R is 40 mm. The spacer thickness in the non-compressed state of course depends on its stiffness or resistance to compression as compared to the stiffness against deformation of the mirror plate 31.

The figures show cross sections of the surfaces of the stamper 29 or mirror plate 31 in a longitudinal cross section, i.e. a section on a plane in which the mold axis of symmetry lies. It will be seen that the mirror plate 31 comprises a substantially frusto-conical molding surface, the conical axis of which is coincident with the mold axis and the disc axis, which lie within the section planes. The frusto-conical molding surface lies at an angle to the axes, as seen in the drawing.

The gradient angle may be defined as that between the conical or longitudinal axis and a perpendicular to the axis, having a sine defined by the fraction Y/R. That is, Y is the distance, measured in a direction parallel to the axis, from the apex of the cone to a point on the periphery of the frusto-conical surface; and R is the distance, measured perpendicular to the axis, from the axis to the same point on the periphery of the frusto-conical surface. The same meanings apply in the following claims. The same meanings apply in the following claims. The invention includes any deliberate angle whose sine is between about 0 and about 0.001. Because the angles are small, this is essentially the same as the angle being between 0 and 0.001 in radian measure. Because of the gradient or angle, the depth of the cavity C increases toward the outer periphery 31e.

Naturally, the mirror plate 31 may assume a shape which, while remaining substantially frusto-conical, can also be curved in the longitudinal cross section which is shown in the drawing. This may come about due to the radial stiffness function of the mirror plate 31. The same is of course true of the stamper 29, if that is alternatively a conical element (or if both the stamper 29 and mirror plate 31 are substantially conical). The present invention includes predetermined stiffness/elastic or plastic mechanical bending characteristics to provide optimal or desired substantially frusto-conical shapes adapted to different resins or conditions.

Given that the invention includes substantially frusto-conical surfaces whose surface angle may thus vary somewhat as a function of radius (distance from the axis), the invention Includes any deliberate set of angles, the sines of which are between about 0 and about 0.001.

In the above-described embodiments of the present invention, the gradient in the cavity depth and the protrusion of the inserting block from the mirror plate are provided on the side of the movable mirror plate 31. However, the present invention is not limited to locating these features on the movable mirror plate 31, or to placing both on the same side of the mold (movable or stationary). If the stamper is provided on the movable mirror plate 31, then above-described gradient and protrusion would have to be provided on the surface of a mirror plate opposite to the surface of the stamper, or a back-up plate under it. It is also within the scope of the present invention that the stamper may be bent.

In operation, polycarbonate resin is used for an injection compression molding of the invention. The temperature of the heating barrel of the injection molding machine preferably is set at 380 degrees centigrade on its front portion, at 360 degrees centigrade on its middle portion, and at 280 degrees centigrade its rear portion. The temperatures of the stationary mirror plate 21 and the movable mirror plate 31 preferably are both set at 110 degrees centigrade. The temperatures of the female cutter 23, the sprue bushing 24, the ejector sleeve 34, and the male cutter 35 are preferably all set at 40 degrees centigrade. A predetermined amount of resin, plasticized in the heating barrel, is injected into the cavity C of the closed moldhalves 100 through the inner hole 24b of the sprue bushing 24.

The resin is injected into the cavity C at a high injection rate and then held at a holding pressure. Simultaneously the moldhalves 100 opens slightly because the force of the injected resin acts against the surface 31s of the movable mirror plate 31 in the cavity C and overcomes the clamping force. Preferably the clamping force is then increased, resulting in closing the moldhalves 100. In one embodiment of the invention the first, lower clamping force is set at two tons and the second, higher one is set at seventeen tons. The second clamping force causes the injected resin to be spread from the center of the cavity C.

The behavior of the compressed resin in the cavity C is affected by the presence of the slight protrusion and the gradient of the movable mirror plate surface. When the resin injected into the cavity C is compressed by the higher clamping force, the injected resin on the tip surface of the inserting block 33 is compressed intensively owing to the presence of the protrusion of the inserting block 33 and it is spread toward the outer periphery of the cavity C where the injected resin has not yet flowed.

Just as the hydraulic resistance of a large pipe is less than that of a small pipe, so the flow resistance of the compressed resin decreases as the cross area of the cavity C increases (due to the gradient of the surface 31s of the movable mirror plate 31). The flow resistance decreases with increasing diameter. Furthermore, there is no reverse flow of the compressed resin into the sprue hole 24b. The flow resistance is of course relatively higher near the center.

Thus a combination of the gradient of the movable mirror plate surface, the protrusion of the tip surface of the inserting block, and injection compression molding results in improving the optical property of the molded discs.

After the resin is compressed, the male cutter 35 is advanced to make the central opening 15 of the disc. Then the moldhalves opens for ejector sleeve 34 to eject the molded disc.

Figure 5:
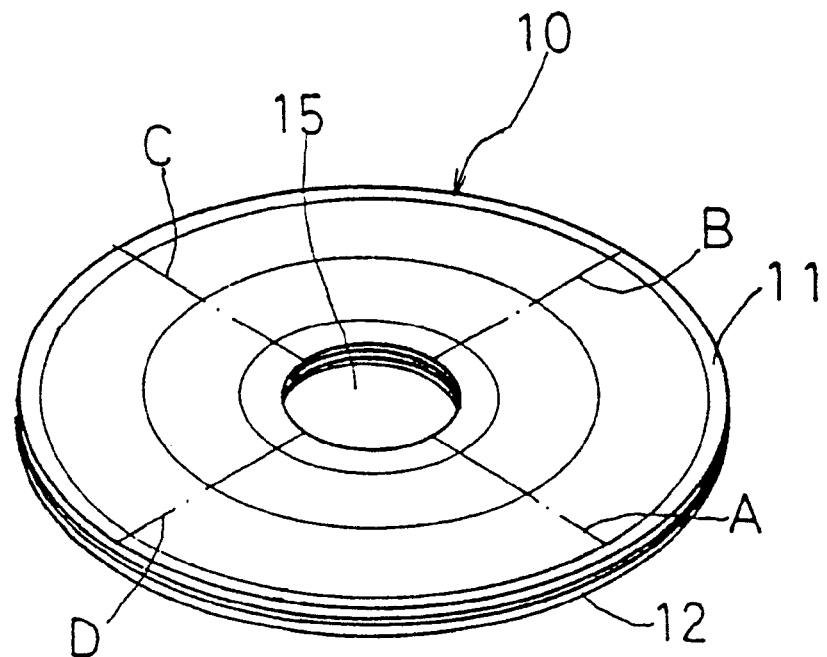
FIG. 5 is a perspective view of a molded disc indicating the positions where the thickness of the measured.
Figure 6:
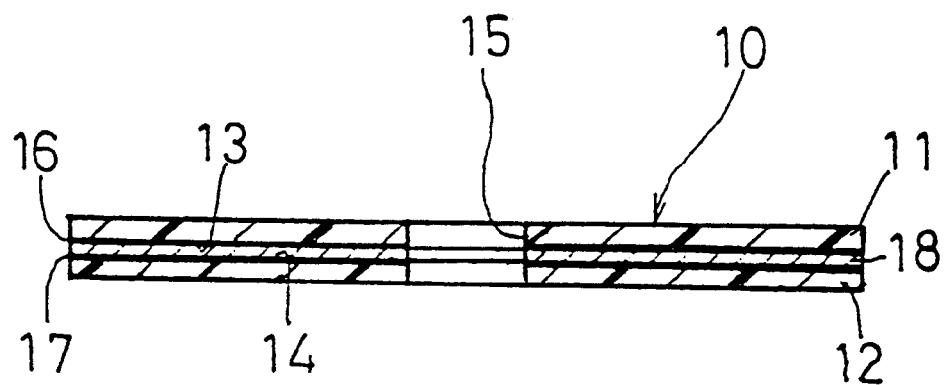
FIG. 6 is a sectional view of a completed DVD disc.

Table 1 shows the thickness of discs molded by injection compression molding of the present invention. The measured positions are on points of different diameters along the A-, B-, C-, and D-lines of the molded disc as shown in FIG. 5.

TABLE 1

| position Diameter | On A-line mm | On B-line mm | On C-line mm | On D-line mm |
|---|---|---|---|---|
| 45 mmΦ | 0.608 | 0.606 | 0.608 | 0.609 |
| 80 mmΦ | 0.608 | 0.606 | 0.606 | 0.609 |
| 115 mmΦ | 0.611 | 0.607 | 0.607 | 0.612 |

As will be understood from the data of Table 1, the 0.006 mm of deviation is within the 10 micron value required by the regulations for the standard DVD-9 (dual layer).

Figure 7:
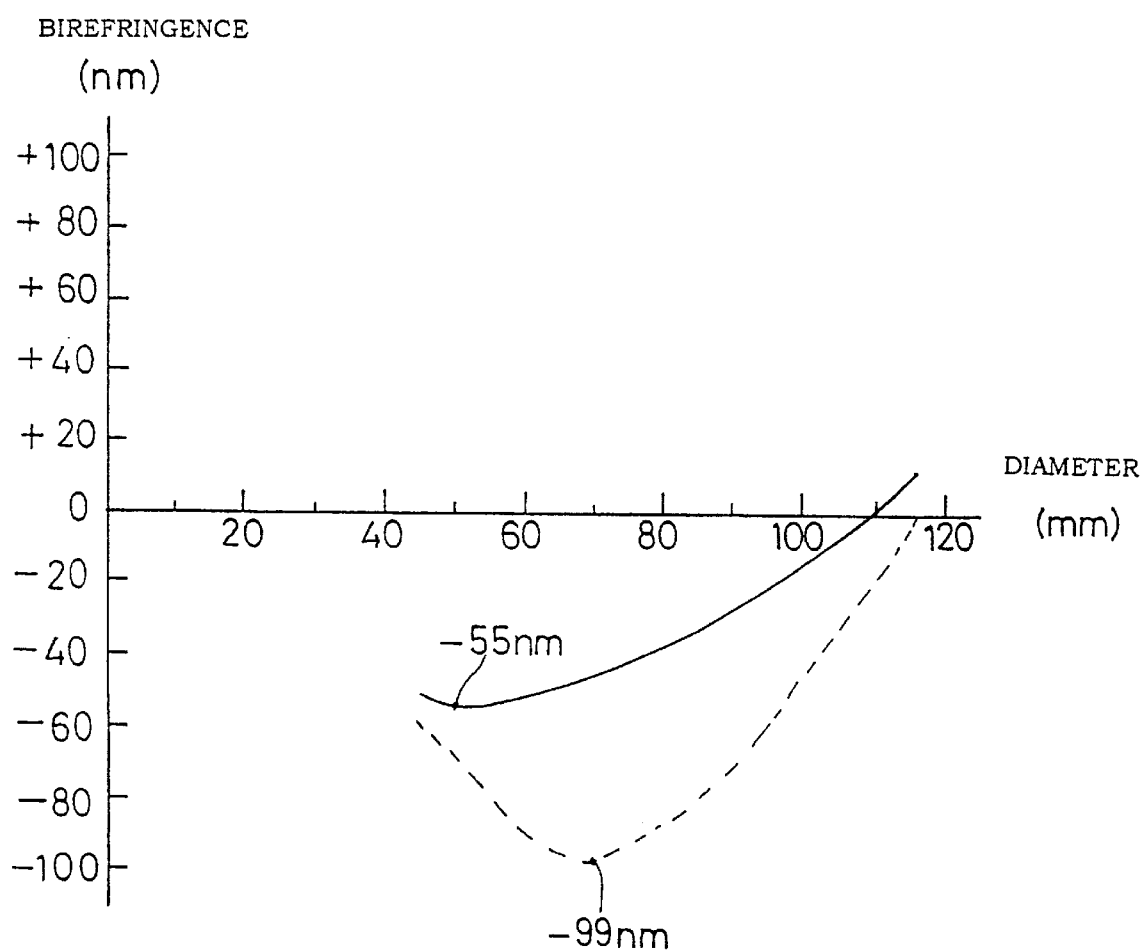
FIG. 7 is a graphical view representing the value of birefringence in the present invention and conventional method.

FIG. 7 graphs comparative birefringence values, as measured by the double pass method, for discs made by the injection compression molding of the present invention and by conventional injection molding. The horizontal axis and the vertical axis represent the diameter and birefringence of the molded disc, respectively. The solid line represents the disc of the present invention and the broken line represents the conventional-method disc. The birefringence was measured in the range of an information area of the disc 43 mmΦ to 115 mmφ.

The minimum birefringence value is −55 nm in the present invention and −99 nm with the conventional method.

As mentioned above, the present invention includes a novel method and apparatus for molding thin disc substrata which results in injection compression molding the discs with low birefringence and even thickness in combination with a gradient in depth of the cavity and a slight protrusion of the tip surface of the inserting block into the cavity. Aside from the improved disc quality the present invention reduces maintenance costs for the movable mirror plate by using a movable back-up plate with a gradient or using at least one spacer 41 of a doughnut shape inserted on the outer periphery of the flange 33a of the inserting block 33.

In the present invention the stamper may be mounted on either the movable or the fixed side of the mold.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. In a mold, for injection molding thin disc substrata, having a cavity formed when the mold is closed, the cavity including a stamper surface, a front surface of an inner stamper retainer, a front surface of a female cutter, a front surface of a sprue bushing, a surface of a mirror plate opposite to the stamper surface, a tip surface of an inserting block, a front surface of an ejector sleeve, a front surface of a male cutter, and an inner peripheral surface of an outer stamper retainer, the improvement wherein:

the tip surface of the inserting block protrudes into the cavity from the surface of the mirror plate at a central opening; and a depth of the cavity between the stamper surface and the mirror plate increases in proportion to radius from a central opening to an outer periphery;

the surface of the mirror plate opposite to the stamper surface includes a gradient Y/R gradually increasing the depth of the cavity, wherein Y is between approximately 5 μm and approximately 30 μm and R is approximately 40 mm, and a back surface of the mirror plate contacts a contact surface of a back-up plate, wherein the contact surface of the back-up plate includes said gradient Y/R, whereby said back-up plate deforms said mirror plate to provide said gradient Y/R in said mirror plate.

2. The mold of claim 1 wherein the tip surface of the inserting block protrudes, from the surface of the mirror plate opposite to the stamper surface into the cavity, between approximately 10 μm and approximately 70 μm.

3. In a mold, for injection molding thin disc substrata, having a cavity formed when the mold is closed, the cavity including a stamper surface, a front surface of an inner stamper retainer, a front surface of a female cutter, a front surface of a sprue bushing, a surface of a mirror plate opposite to the stamper surface, a tip surface of an inserting block, a front surface of an ejector sleeve, a front surface of a male cutter, and an inner peripheral surface of an outer stamper retainer, the improvement wherein:

the tip surface of the inserting block protrudes into the cavity from the surface of the mirror plate at a central opening;

a depth of the cavity between the stamper surface and the mirror plate increases in proportion to radius from a central opening to an outer periphery;

the surface of the mirror plate opposite to the stamper surface includes a gradient Y/R gradually increasing the depth of the cavity, wherein Y is between approximately 5 $\mu$m and approximately 30 $\mu$m and R is approximately 40 mm;

at least one spacer of a doughnut shape is locked on the outer periphery of the flange of the inserting block, whereby said spacer deforms said mirror plate to provide said gradient Y/R in said mirror plate.

4. The mold of claim 3 wherein the tip surface of the inserting block protrudes, from the surface of the mirror plate opposite to the stamper surface into the cavity, between approximately 10 $\mu$m and approximately 70 $\mu$m.

* * * * *